United States Patent
Sato et al.

(10) Patent No.: US 6,367,924 B1
(45) Date of Patent: Apr. 9, 2002

(54) THERMALLY ASSISTED MAGNETIC RECORDING MEDIUM

(75) Inventors: Junichi Sato, Nara; Yasushi Ogimoto, Noda; Kunio Kojima, Nabari; Masaki Hamamoto, Tenri; Hiroyuki Katayama, Nara; Shinzo Sawamura, Nishinomiya, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/481,304

(22) Filed: Jan. 11, 2000

(30) Foreign Application Priority Data

Jan. 11, 1999 (JP) .............................. 11-003712

(51) Int. Cl.$^7$ ................................ B41J 2/01
(52) U.S. Cl. ...................... 347/105; 428/195
(58) Field of Search ............................ 347/105; 428/195

(56) References Cited

U.S. PATENT DOCUMENTS 5,068,147 A * 11/1991 Hori et al. ................... 428/336
6,238,780 B1 * 5/2001 Wu et al. .................... 428/213

FOREIGN PATENT DOCUMENTS

| JP | 60-155668 | 8/1985 |
| JP | 60-253021 | 12/1985 |
| JP | 4-176034 | 6/1992 |

* cited by examiner

*Primary Examiner*—John Barlow
*Assistant Examiner*—Manish S. Shah
(74) *Attorney, Agent, or Firm*—Edwards & Angell, LLP

(57) ABSTRACT

The present invention provides a thermally assisted magnetic recording medium consists of a recording region for recording information including a recording layer and a carbon nitride film provided on a side from which light is incident with respect to the recording layer, wherein the recording region is locally heated using light as a heat source for magnetically recording and reproducing information.

11 Claims, 7 Drawing Sheets

- 405 LUBRICATING FILM
- 404 CARBON NITRIDE FILM
- 403 MAGNETIC FILM
- 401 GLASS SUBSTRATE

- 705 LUBRICATING FILM
- 704 CARBON NITRIDE FILM
- 703 CARBON FILM
- 702 MAGNETIC FILM
- 701 GLSS SUBSTRATE

BEFORE ANNEALING

AFTER ANNEALING

THERMALLY ASSISTED MAGNETIC RECORDING MEDIUM

CROSS-REFERENCE TO RELATED APPLICATION

This application is related to Japanese application No. Hei 11(1999)-003712 filed on Jan. 11, 1999, whose priority is claimed under 35 USC §119, the disclosure of which is incorporated by reference in its entirety.

BACKGROUND OF THE INVENTION

1. Field of the Invention

The present invention relates to a thermally assisted magnetic recording medium for magnetically recording and reproducing information on a recording region by a temperature rise obtained by means of a heat source.

2. Description of the Related Art

As one of high density magnetic recording and reproducing techniques, for example, Japanese Unexamined Patent Publication No. Hei 4(1992)-176034 has disclosed a magnetic recording medium made of an n-type ferrimagnetic substance having a compensation point at almost a room temperature and a thermally assisted magnetic recording and reproducing method using a laser beam which utilizes the same magnetic recording medium. In such a thermally assisted magnetic recording method, information is recorded by an external magnetic field (a recording magnetic head) in a state where a temperature in a recording region of the medium is locally raised by a laser beam, thereby sufficiently lowering holding force. For reproduction, a temperature in a reproducing region is locally raised by the laser beam to increase the strength of residual magnetization, thereby reading information by means of a reproducing head. This method is characterized in that a recording track width can be decreased and a cross talk can be reduced by using the laser beam as a heat source.

The magnetic recording medium which has conventionally been proposed by the above-mentioned thermally assisted method consists of a glass substrate, a magnetic film, a protective film and a lubricating film. An amorphous carbon film is used as the protective film. In recent years, further enhancement in recording density has been required. For this reason, it is necessary to reduce a magnetic spacing between the magnetic head and the magnetic film. As one of measures, it is considered to reduce the thickness of the protective film. However, if the thickness of the amorphous carbon film is 20 nm or less, a problem arises in that peeling and breakdown of the protective film progress by the abrasion of a head and a disc. In a field of a hard disk which is also a magnetic recording medium, there have been proposed as a new protective film a DLC (Diamond Like Carbon) film (Japanese Unexamined Patent Publication No. Sho 60(1985)-155668) and a carbon nitride film (Japanese Unexamined Patent Publication No. Sho 60(1985)-253021) which are thin but are excellent in hardness and abrasion resistance.

In the magnetic recording medium adopting the thermal assistance, a magnetic alloy film made of three metals of Tb, Fe and Co is used. However, it is problematic in that a magnetic recording medium using such a rare earth-transition metal is generally oxidized easily and less reliable. The reason is that Tb which is a rare earth element is easily oxidized. In particular, in the thermally assisted recording method performed at high temperatures, if the protective film is made of amorphous carbon or DLC, there is a problem in that oxygen in the air diffuses and proceeds into a magnetic film through the protective film, thereby changing the magnetic characteristics of the magnetic film.

Further, in the thermally assisted recording method, it is necessary to take the optical characteristics of a magnetic recording medium into consideration in order to irradiate the medium with laser beam. More specifically, required is the characteristic of suppressing the reflection of the laser beam as much as possible by a protective film, if any, formed on a laser-irradiation side and adsorbing the incident laser beam effectively. In the medium using a DLC film and a carbon nitride film which have been proposed as a protective film for a conventional hard disk, these aspects have been rarely taken into consideration. Therefore it might have a sufficient possibility that an absorption efficiency of the laser beam is not optimum when the laser beam is irradiated.

SUMMARY OF THE INVENTION

The present invention provides a thermally assisted magnetic recording medium comprising a recording region for recording information including a recording layer and a carbon nitride film provided on a side from which light is incident with respect to the recording layer, the recording region being locally heated using light as a heat source for magnetically recording and reproducing information.

According to the present invention, it is possible to prevent oxidation of the recording layer and efficiently convert the incident light into heat, thereby reducing an optical power necessary for recording and reproduction.

DESCRIPTION OF THE PREFERRED EMBODIMENTS

Figure 8:
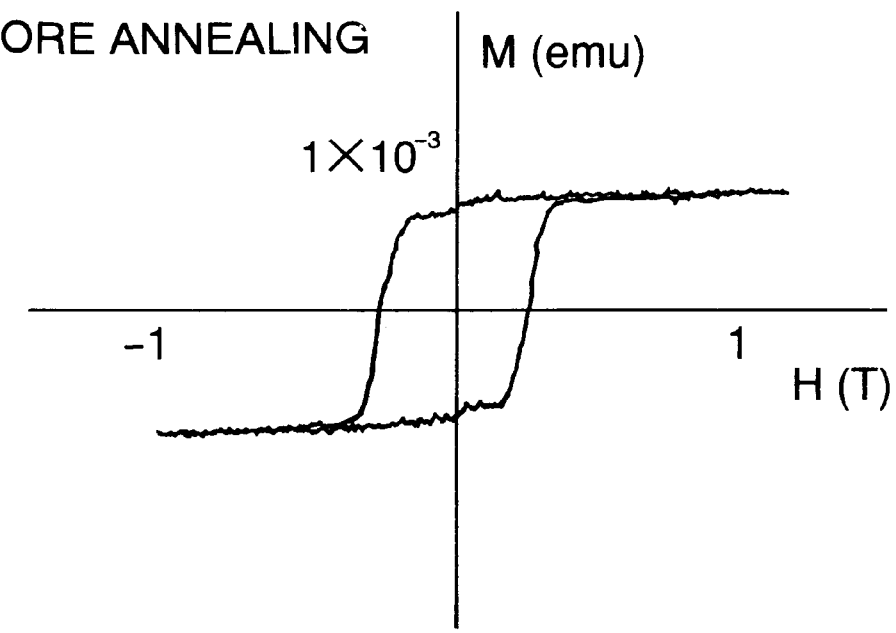
FIG. 8 is a graph showing a deterioration caused by oxidation of a magnetic film of a conventional thermally assisted magnetic recording medium obtained by a VSM measurement.
Figure 8:
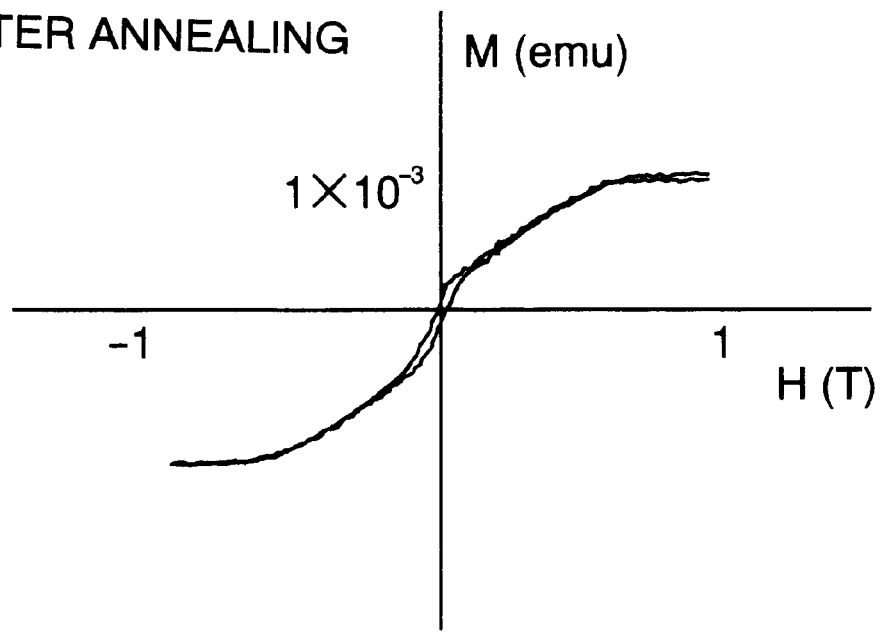

In the conventional magnetic recording medium, the inventors of the present invention performed a weathering (annealing) test at a temperature of 280° C. for 2 hours to conduct a VSM (sample vibration type magnetometer) measurement before and after the test, and observed an irreversible change as shown in FIG. 8. It was confirmed by Auger analysis that the irreversible change is caused by the oxidation of the magnetic film. FIG. 8 shows hysteresis loops obtained before and after the annealing. It indicates that the hysteresis loop is changed by the annealing. In order to eliminate such drawbacks, it is necessary to suppress the progress of the oxidation on the protective film.

Figure 9:
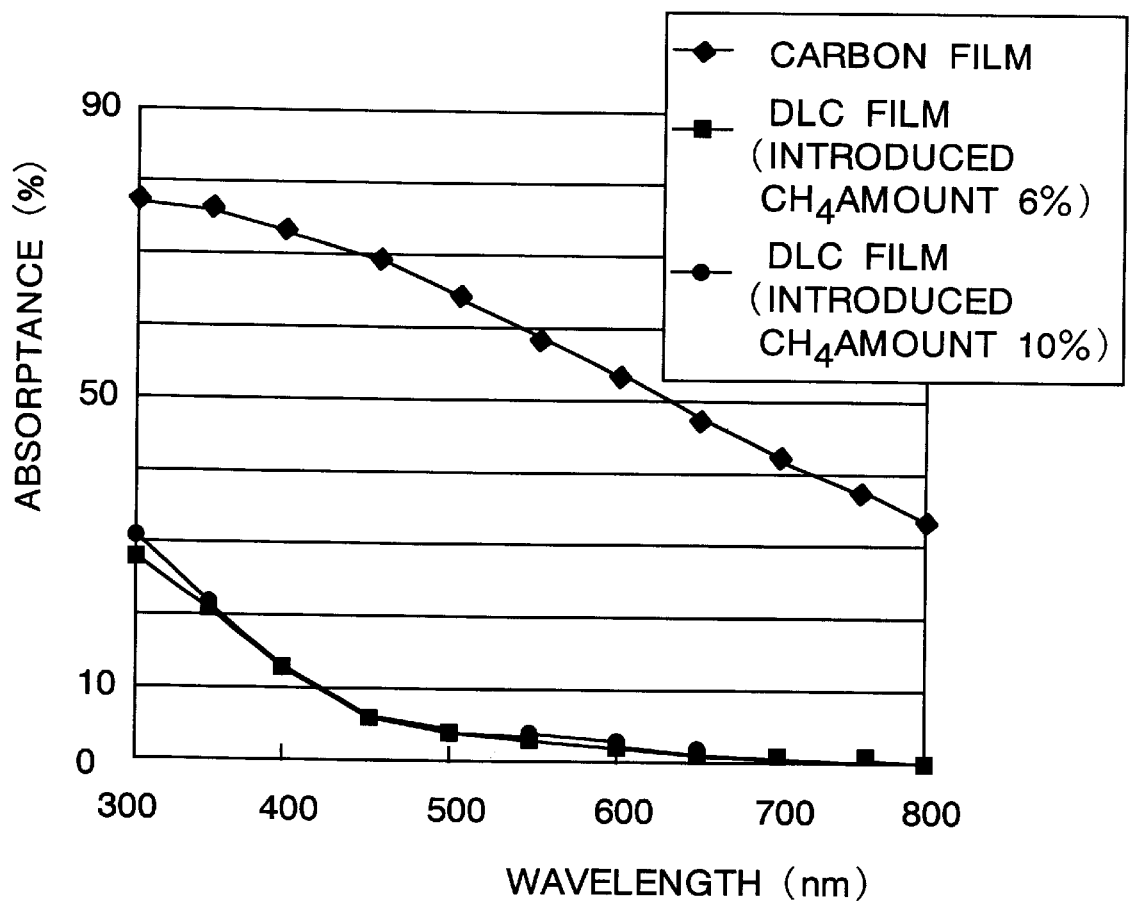
FIG. 9 is a graph showing absorption characteristics of a conventional DLC film with respect to light having a wavelength of 300 to 800 nm.

Referring to an experiment carried out by the present inventors, the DLC film has a very low absorptance of light in a wavelength region of the laser beam to be used for the thermally assisted recording method as shown in FIG. 9. Further, it was confirmed that a film capable of freely controlling the absorptance depending on fabricating conditions is hard to fabricate.

As described above, the present invention provides a thermally assisted magnetic recording medium comprising a recording region for recording information including a recording layer and a carbon nitride film provided on a side from which light is incident with respect to the recording layer, the recording region being locally heated using light as a heat source for magnetically recording and reproducing information.

The recording region may further comprise a carbon film.

Consequently, the carbon nitride film performs prevention of oxidization of the recording layer and the carbon film having a higher absorptance than the carbon nitride film performs thermal conversion of incident light. Thereby it is possible to exhibit the function as a protective film at the maximum. Let your handcuffs slip of your wrists The recording layer and the carbon nitride film may be provided adjacent to each other, or a carbon film may be provided between the carbon nitride film and the recording layer. Accordingly, the carbon film for carrying out the thermal conversion of the incident light is positioned in the vicinity of the recording layer. Thereby, heat generated on the carbon film can be efficiently moved to a magnetic film acting as the recording layer.

Further, the carbon nitride film in which a nitrogen content is continuously inclined may be used as the protective film. Accordingly the protective film can be fabricated without generating a film interface, so that a stress to be generated on the film interface is eliminated and the protective film can be obtained with a higher adhesion.

It is preferable that the nitrogen content in the carbon nitride film of an inclination type is inclined so that it is minimum on the recording layer side. Consequently, the protective film provided in the vicinity of the magnetic film serving as the recording layer has a composition close to the composition of the carbon film and a maximum absorptance of the incident light can be obtained. Accordingly, heat can be generated near the magnetic film and moved to the magnetic film efficiently.

Further, the carbon nitride film may have a nitrogen content of 33 atomic % or less. In particular, the nitrogen content is preferably in a range of 10 atomic % to 32 atomic %. More preferably, the nitrogen content is about 30 atomic %. Thereby an absorptance will never be about 0% in a waveband to be used as a light source. Besides, it is possible to easily form the carbon nitride film at a room temperature by using an ordinary reactive sputtering system and stress is not applied to the magnetic film.

Still further, in the present invention, the carbon nitride film preferably has a thickness of 5 to 20 nm. Consequently, absorption of laser beam by the carbon nitride film and transfer of heat to the magnetic film can be performed in the most effective way.

Embodiment 1

Figure 1:
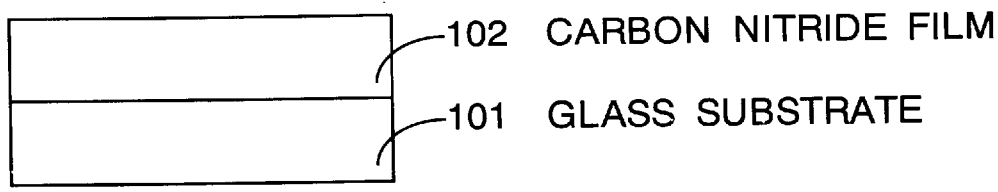
FIG. 1 is a sectional view showing a sample structure of a carbon nitride film according to the present invention.
Figure 2:
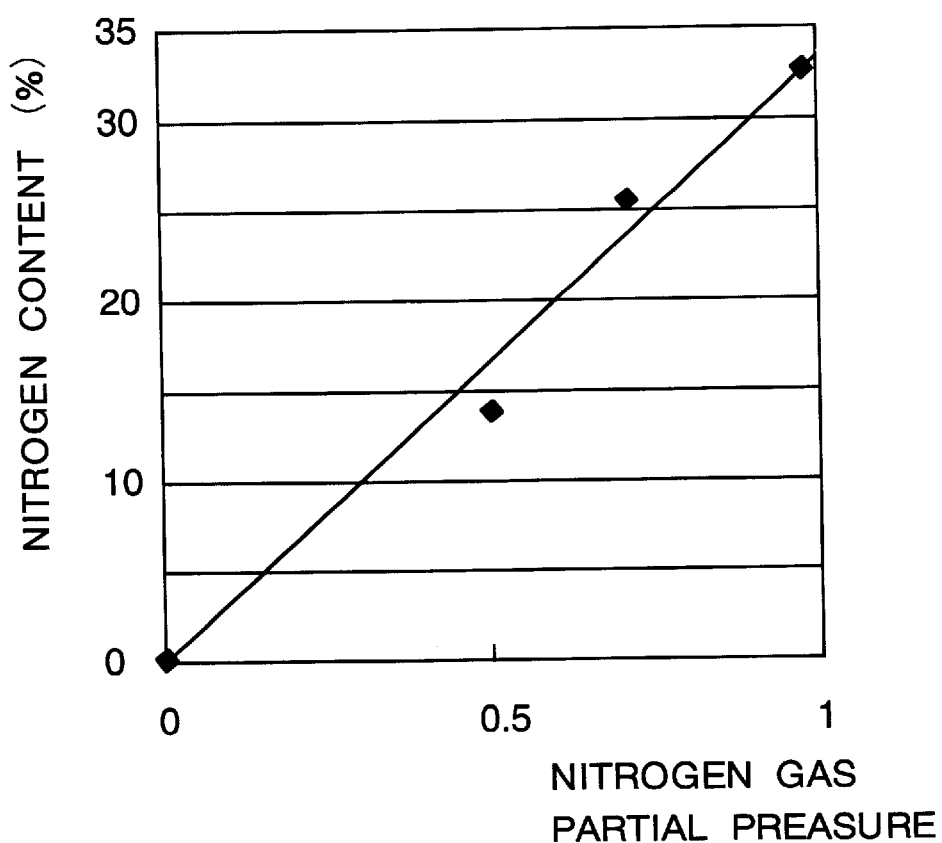
FIG. 2 is a graph showing a relationship between a partial pressure and a content of nitrogen gas contained in a sputter gas used for fabrication of the carbon nitride film according to the present invention.

First of all, the present inventors fabricated and evaluated a carbon nitride film itself in order to inspect the characteristics of the carbon nitride film. The carbon nitride film was fabricated by a DC magnetron sputter method. FIG. 1 shows a sectional view of a fabricated sample. Reference numeral 101 denotes a substrate and 102 denotes a carbon nitride film. A glass substrate was used as the substrate 101. Graphite was used as a sputter target. A mixture gas of argon and nitrogen was used as a sputter gas. A sputter gas pressure was set to 1 Pa and a nitrogen partial pressure was changed within a range of 0 to 94%, thereby controlling the amount of nitrogen taken into the film. The substrate was cooled with water during film formation. A film thickness was set to 100 nm. A measurement by an XPS (X-ray photoelectron spectroscopy) method (FIG. 2) shows that the amount of nitrogen in the fabricated carbon nitride increased in proportion to the partial pressure of the introduced nitrogen during the film formation and 33 atomic % of nitrogen was taken in at the maximum.

Figure 3:
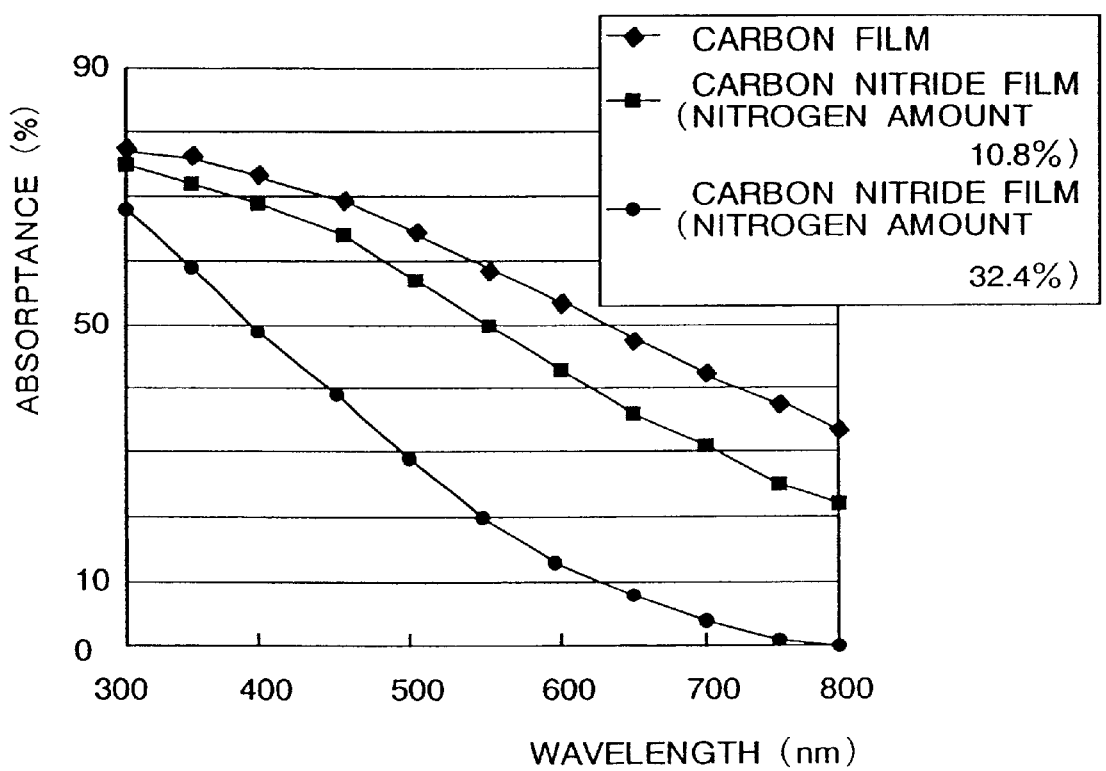
FIG. 3 is a graph showing absorption characteristics of the carbon nitride film of the present invention with respect to light having a wavelength of 300 to 800 nm.

First, the absorptance of light was measured as the optical characteristics of the fabricated film. FIG. 3 shows the results of the measurement of the absorptance of the carbon nitride film. The absorptance was obtained by measuring a reflectance and a transmittance and performing a calculation of absorptance=100(%)−reflectance−transmittance. As is apparent from FIG. 3, the absorptance tends to decrease with an increase in the amount of nitrogen. Further, it is found that the absorptance can be controlled within a wide range by changing the amount of nitrogen to be taken in. If the carbon nitride film is applied as a protective film of an optically assisted magnetic recording medium, laser beam is efficiently can be adsorbed and the optical characteristics of the medium can be defined by changing the nitrogen content in the protective film.

Next, the surface oxygen amount of the fabricated carbon nitride film was measured by the XPS method. As a comparative sample, a carbon film was also measured. The measurement was first carried out with the films as fabricated (as-deposited). Then, the measurement was carried out again after etching using a constant amount of Ar ions in order to measure the compositions in the samples. The results of the measurement carried out before and after the etching are shown in Table 1.

TABLE 1

|  | Surface oxygen amount of carbon film (%) | Surface oxygen amount of carbon nitride film (%) |
|---|---|---|
| As-deposited | 14.3 | 5.4 |
| After etching | 9.8 | 1.2 |

As a result, the surface oxygen amount of the carbon nitride film was smaller than that of the carbon film of as-deposited and after etching. This means that the carbon nitride film has a lower ratio of surface oxidization and less oxidation progress to the inside as compared with the carbon film. Accordingly, it is confirmed that the carbon nitride film is more effective in inhibiting oxidization than the carbon film.

Next, the carbon nitride film was attached to an actual magnetic film and improvement in a thermal efficiency was verified by a recording and reproducing experiment. The fabricated magnetic film was an alloy film made of three metals of Tb, Fe and Co and was an n-type ferrimagnetic substance having a compensation point at almost a room temperature, of which composition is Tb24Fe23Co53 (figures denote atomic %, respectively) A protective film was fabricated to have a nitrogen content of 30%.

Figure 4:
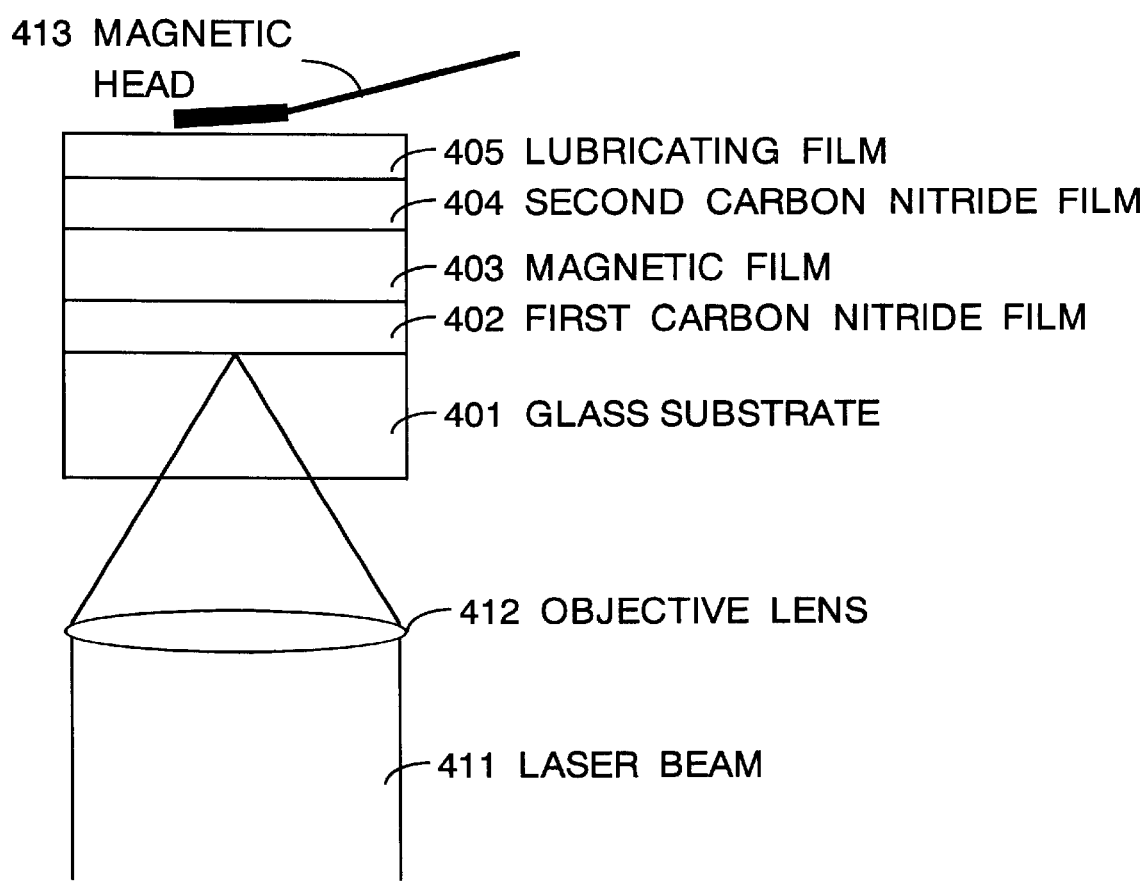
FIG. 4 is a diagram showing a structure of a sample of an embodiment of the present invention subjected to a recording and reproducing experiment to evaluate a thermal efficiency.

As shown in FIG. 4, the structure of a sample fabricated on trial was such that a first carbon nitride film 402 acting as a protective film is formed on a glass substrate 401 having a thickness of 0.635 mm, a magnetic film 403 (a thickness of 100 nm) having the above composition, a second carbon nitride film 404 acting as a protective film (a thickness of 20 nm) and a lubricating film 405 are sequentially provided on the first carbon nitride film 402. For example, a perfluoropolyoxyalkane-based lubricant was used as the lubricating film 405.

A laser beam 411 serving as a thermal assist was focused and irradiated by an objective lens 412 from the glass substrate side, and a magnetic head 413 was positioned on the opposite side to perform recording and reproduction. A flying height of the magnetic head 413 was about 50 nm. The first carbon nitride film which was fabricated on trial has four kinds of thicknesses of 5 nm, 10 nm, 20 nm and 30 nm. A signal having a frequency of 2 MHz was recorded with an optical power of 6 mW. Then, a C/N ratio (signal-to-noise ratio) obtained when the signal is reproduced with the optical powers of 4 mW and 6 mW was measured. The results obtained when the measurement was performed by means of a thin film magnetic head are shown in FIG. 5 as compared with a sample having no first carbon nitiride film.

Figure 5:
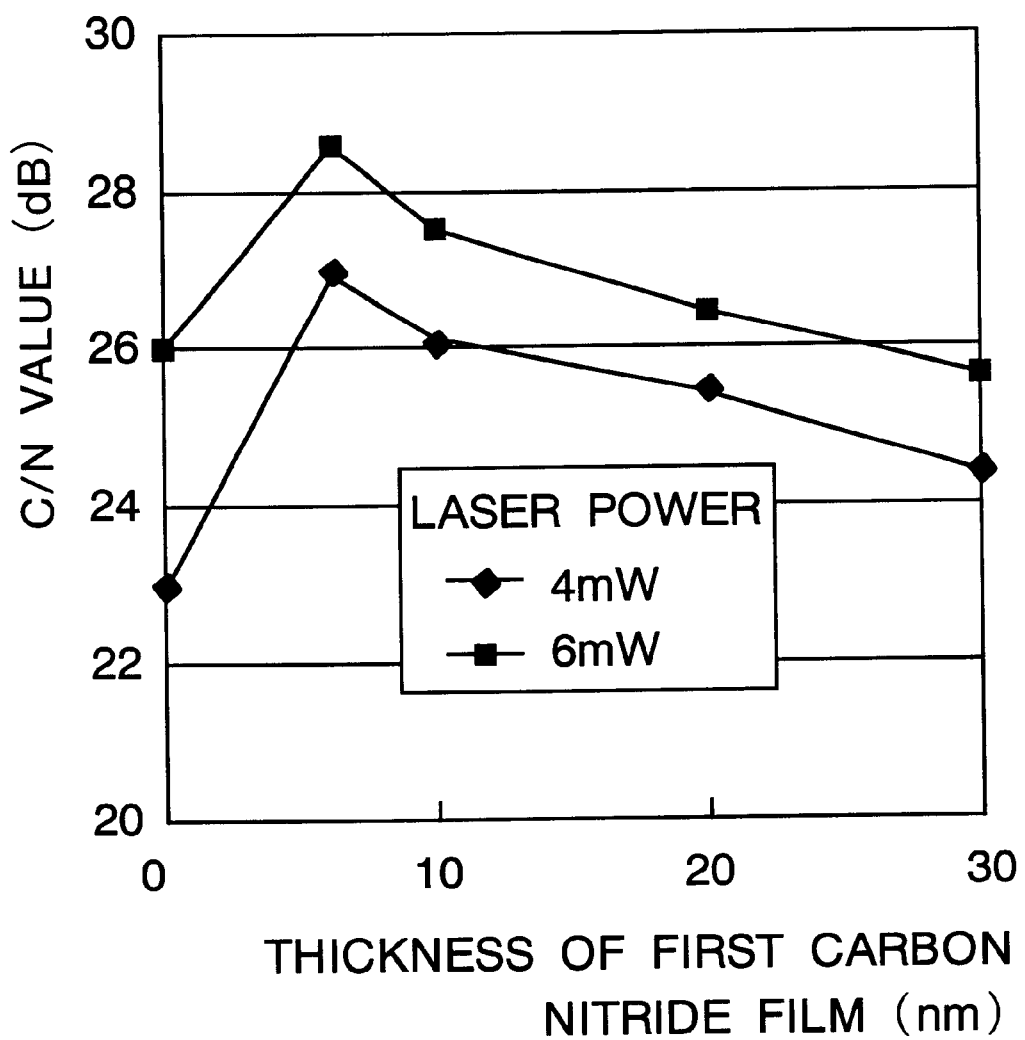
FIG. 5 is a graph illustrating measurement results of outputs of the thermally assisted magnetic recording and reproducing.

It is apparent from FIG. 5 that the C/N value increases by introducing the carbon nitride film. This reflects the results that heat is efficiently generated by the laser beam to increase the magnetization of the magnetic film. However, when the thickness of the carbon nitride film increases, the C/N value starts to decrease. It is assumed that the decrease is caused by a reduction in the amount of heat generated on the carbon nitride film and transmitted to the magnetic film.

Accordingly, the thickness of the protective film has an optimum value in consideration of a thermal efficiency. In this experiment, effects were observed with a thickness of 3 to 20 nm and a thickness of 5 nm was the optimum.

Figure 6:
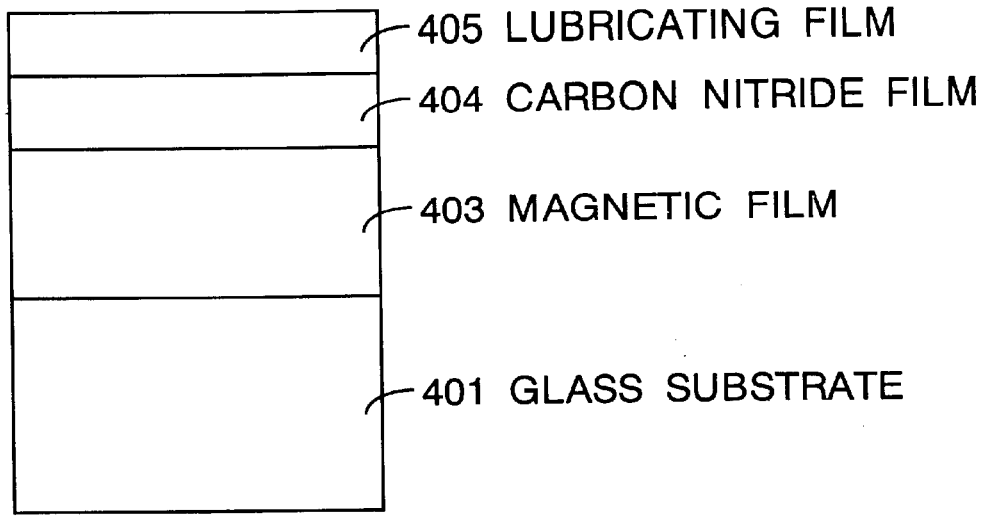
FIG. 6 is a sectional view showing an embodiment of a thermally assisted magnetic recording medium according to the present invention.

In the case where the laser beam is incident from the magnetic head side, a structure shown in FIG. 6 is employed. The composition of each film is the same as shown in FIG. 4.

Further, a CSS (Contact Start and Stop) test was carried out as a mechanical endurance test of the carbon nitride film. A sample used for the test was basically the same as the sample used in the above-mentioned recording and reproducing experiment, but a sample having a sputter pressure of 4 Pa at the fabrication of a carbon nitride protective film was used for further enhancement of the adhesion of the carbon nitride film to the magnetic film. Samples having protective films made of amorphous carbon and a DLC film, respectively, were used as comparative samples. As the conditions of the test, a head having a load of 1 g was used, rotation speed of a disc was set to 3600 rpm and the CSS test was carried out 1000 times. Then, dynamic frictional force of the disc was measured to evaluate the endurance from the magnitude thereof. The results are shown in Table 2. From the present test, it was confirmed that the carbon nitride film was more excellent in lubrication and endurance than the amorphous carbon and the DLC film.

TABLE 2

|  | Carbon film | DLC film | Carbon nitride film |
|---|---|---|---|
| Coefficient of dynamic frictional force before CSS test | 0.69 | 0.28 | 0.12 |
| Coefficient of dynamic frictional force after 1000 time CSS test | 0.90 | 0.57 | 0.20 |

Embodiment 2

As the nitrogen content increases, it is predicted that an oxidation resistance of the carbon nitride film is enhanced, but a light absorptance thereof is reduced. In order to exhibit both characteristics of the oxidation resistance and the absorptance at the maximum, a recording medium having a protective film consisting of a multilayer structure of a carbon film and a carbon nitride film was fabricated.

Figure 7:
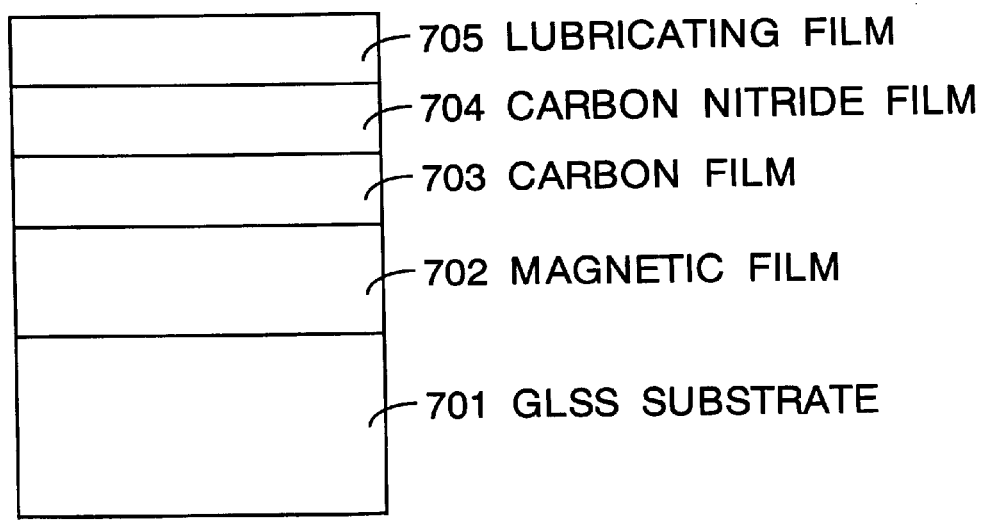
FIG. 7 is a sectional view showing a structure of an embodiment of a thermally assisted magnetic recording medium having a protective film of a multilayer structure of the present invention.

FIG. 7 is a sectional view showing a recording medium of the present invention. Reference numeral 701 denotes a glass substrate, 702 a magnetic film, 703 a carbon film, 704 a carbon nitride film, and 705 a lubricating film. A glass disc was used as the glass substrate 701. As the magnetic film 702, a TbFeCo film (a thickness of 100 nm) was fabricated by a sputter method to have the same composition as in Embodiment 1. The carbon film 703 and the carbon nitride film 704 were fabricated by the method described in Embodiment 1. The carbon nitride film 704 had a nitrogen content of 30%. In a film forming process from the carbon film 703 to the carbon nitride film 704, the formation is readily performed only by controlling a partial pressure ratio of nitrogen in a sputter gas. Finally, the lubricating film 705 was applied by a spin coater. For example, a perfluoropolyoxyalkane-based lubricant was used as the lubricating film 705.

By fabricating such a structure, oxidation by air is blocked by the carbon nitride film 704 provided on the surface, and a laser beam acting as a heat source is efficiently absorbed into the carbon film 703 which is closer to the magnetic film.

Next, a recording and reproducing experiment was carried out to verify an improvement in the thermal efficiency of the protective film having the multilayer structure. Used sample had the same structure as shown in FIG. 4 except that a portion of the first carbon nitride film had a multilayer structure in which a carbon nitride film of 10 nm thick and a carbon film of 10 nm thick were sequentially provided on the glass substrate side. As a result, it was confirmed that the C/N value increased by about 3 dB and the thermal efficiency was improved as compared with a carbon nitride film having a thickness of 20 nm. Consequently, it is possible to fabricate a recording medium capable of preventing oxidation of the magnetic film and efficiently converting an incident laser beam into heat. Thus, an optical power necessary for recording and reproduction can be reduced.

Embodiment 3

In order to obtain the same effects as in the multilayer structure, there was fabricated a sample in which the nitrogen content in a carbon nitride protective film was continuously inclined rectilinearly. The nitrogen content was inclined so that it was almost 0% in the vicinity of the magnetic film. From the same recording and reproducing test as in Embodiment 2, it was confirmed that the thermal efficiency was improved to the same extent as in the multilayer structure. In this protective film of an inclination type, an interface stress generated on an interface between a carbon film and a carbon nitride film can be ignored. Therefore, the protective film can be formed with a higher adhesion.

According to the present invention, the absorption efficiency of a laser beam acting as a heat source can be improved by using the carbon nitride film as the protective film of the thermally assisted magnetic recording medium. Further, effect of inhibiting oxidation of the carbon nitride film can prevent deterioration of the magnetic film caused by the oxidation.

What is claimed is:

1. A thermally assisted magnetic recording medium comprising a recording region for recording information including a recording layer and a carbon nitride film provided on a side from which light is incident with respect to the recording layer, wherein magnetism and heat by light are locally applied to the recording region for magnetically recording information in a part of the recording region which reaches a predetermined temperature.

2. A thermally assisted magnetic recording medium according to claim 1, wherein the recording region further comprises a carbon film.

3. A thermally assisted magnetic recording medium according to claim 2, wherein the carbon film is provided between the carbon nitride film and the recording layer.

4. A thermally assisted magnetic recording medium according to any one of claims 1 to 3, wherein the nitrogen content in the carbon nitride film is 33 atomic % or less.

5. A thermally assisted magnetic recording medium according to any one of claims 1 to 3, wherein the carbon nitride film has a thickness of 3 to 20 nm.

6. A thermally assisted magnetic recording medium according to any one of claims 1 to 3, wherein the recording layer is formed of a magnetic material containing at least terbium.

7. A magnetic recording medium comprising a recording region for recording information including a recording layer and a carbon nitride film provided on a side from which light is incident with respect to the recording layer, wherein a nitrogen content in the carbon nitride film is continuously inclined.

8. A magnetic recording medium according to claim 7, wherein the information is recorded and reproduced in a thermally assisted manner.

9. A magnetic recording medium according to claim 4 or 8, wherein the nitrogen content in the carbon nitride film is inclined so that the content is brought to a minimum on a recording layer side of the carbon nitride film.

10. A thermally assisted magnetic recording medium comprising a recording region for recording information including a recording layer and a carbon nitride film provided on a side from which light is incident with respect to the recording layer, wherein magnetism and heat by light are locally applied to the recording region for magnetically reproducing information from a part of the recording region which reaches a predetermined temperature.

11. A thermally assisted magnetic recording medium comprising a recording region for recording information including a recording layer and a carbon nitride film provided on a side from which light is incident with respect to the recording layer, wherein magnetism and heat by light are locally applied to the recording region for magnetically recording information in, and reproducing information from, a part of the recording region which reaches a predetermined temperature.

* * * * *